United States Patent [19]

Binder et al.

[11] Patent Number: 5,063,067

[45] Date of Patent: Nov. 5, 1991

[54] CONCENTRATED LIQUID FEED SUPPLEMENT CONTAINING POSITIONALLY STABILIZED EAT AND METHOD

[75] Inventors: Stephen F. Binder, Washington, Mo.; Kent J. Lanter, Millstadt, Ill.

[73] Assignee: Purina Mills, Inc., St. Louis, Mo.

[21] Appl. No.: 523,841

[22] Filed: May 15, 1990

Related U.S. Application Data

[63] Continuation of Ser. No. 93,473, Sep. 4, 1987, abandoned.

[51] Int. Cl.$^5$ ............................................. A23K 1/22
[52] U.S. Cl. ........................................ 426/69; 426/72; 426/74; 426/602; 426/623; 426/630; 426/636; 426/807
[58] Field of Search ............... 426/69, 72, 623, 630, 426/636, 807, 602

[56] References Cited

U.S. PATENT DOCUMENTS

| | | | |
|---|---|---|---|
| 2,851,357 | 9/1958 | Bedford | 426/643 |
| 3,010,828 | 11/1961 | Patterson et al. | 426/807 |
| 3,019,109 | 1/1962 | Klothen | 99/2 |
| 3,669,676 | 6/1972 | Karr et al. | 99/7 |
| 3,895,117 | 7/1975 | Backlund | 426/69 |
| 3,901,976 | 8/1975 | Roth et al. | 426/74 |
| 3,962,484 | 6/1976 | Grosso et al. | 426/74 |
| 4,061,728 | 12/1977 | Graham ewt al. | 424/14 |
| 4,117,170 | 9/1978 | Washam | 426/72 |
| 4,171,379 | 10/1979 | Harmon et al. | 426/2 |
| 4,171,385 | 10/1979 | Skoch et al. | 426/658 |
| 4,171,386 | 10/1979 | Skoch et al. | 426/658 |
| 4,182,755 | 1/1980 | McNeff | 424/147 |
| 4,197,319 | 4/1980 | Betz et al. | 426/2 |
| 4,211,796 | 7/1980 | Lanter et al. | 426/2 |
| 4,225,621 | 9/1980 | Lanter et al. | 426/2 |
| 4,230,736 | 10/1980 | Betz et al. | 426/601 |
| 4,234,604 | 11/1980 | Betz et al. | 426/2 |
| 4,265,916 | 5/1981 | Skoch et al. | 426/74 |
| 4,267,197 | 5/1981 | Sawhill | 426/69 |
| 4,285,974 | 9/1981 | Betz et al. | 426/2 |
| 4,311,713 | 1/1982 | Betz et al. | 426/2 |
| 4,642,317 | 2/1987 | Palmquist et al. | 514/558 |
| 4,888,185 | 12/1989 | Miller | 426/69 |

OTHER PUBLICATIONS

Hawley, "The Condensed Chemical Dictionary", Van Nostrand Reinhold Co., 10th edition (1982), pp. 186, 475, 909, 929-930 & 947.

*Primary Examiner*—R. B. Penland
*Attorney, Agent, or Firm*—Cohn, Powell & Hind

[57] ABSTRACT

A high moisture, high energy liquid feed supplement and concentrate for animals (ruminants, cattles) is disclosed which is capable of remaining in stable suspension while containing a high porportion of fat. The suspension is maintained by salts of fatty acids formed in the added fat. Formation of the fatty acid salts is produced by reacting an aqueous base with the fat at an elevated temperature to form the fatty acid salts therein and subsequently adding the additional materials therein.

22 Claims, No Drawings

CONCENTRATED LIQUID FEED SUPPLEMENT CONTAINING POSITIONALLY STABILIZED EAT AND METHOD

This is a continuation of copending application Ser. No. 07/093,473 filed on Sept. 4, 1987, now abandoned.

BACKGROUND AND SUMMARY OF THE INVENTION

This invention relates to liquid feed compositions for animals and the process of producing liquid feed compositions. In particular, the invention relates to liquid feed supplements having an increased energy level and in particular liquid feed supplements which contain a high proportion of added fat. Applicants are aware of the following U.S. Pat. Nos. the disclosures of which are incorporated by reference herein: 3,019,109; 4,061,728; 4,117,170; 4,171,379; 4,171,385; 4,171,386; 4,172,755; 4,197,319; 4,211,796; 4,225,621; 4,230,736; 4,234,604; 4,265,916; 4,285,974; 4,311,713; and 4,642,317.

Liquid feed supplements are widely used for feeding animals, in particular ruminants such as of cattle, sheep and the like. Liquid supplements have several advantages compared to dry feed supplements. One advantage is that since these feed supplements are in a liquid state the different components can be uniformly distributed throughout the liquid medium without difficulty. Furthermore, the liquid nature of these supplements make them economical to manufacture because of the relatively simple type apparatus required for producing liquid feeds as compared to dry supplements.

Conventional liquid feed supplements usually employ a a carbohydrate solution such as molasses and include other nutrients such as calcium and protein sources, including non-protein nitrogen. A disadvantage however of conventional liquid feed supplements is that it is very difficult to provide a liquid feed supplement which supplies a sufficiently high energy level to the animal as is often needed to provide for full growth of the animal or to maintain the animal in good condition. Increasing the energy content of the liquid feed has proved to be very difficult, since incorporation of additional carbohydrate, such as increasing the level of molasses, increases the viscosity of the liquid feed supplement often to the point of rendering it unmanagable. Crystalization or partial solidification of the feed supplement can cause, plugging of piping and other equipment used to transport and contain liquid feed supplements. On the other hand, incorporation of energy into liquid feed supplements by incorporation of fats has also not been successful in providing high energy levels. Fats and water are not normally miscible. Incorporation of any significant amounts of fat in liquid feed supplements has resulted in separation of oil and water phases in the liquid feed supplements and the failure of the supplement to reliably provide suitable feed.

Separation of the oil phase may occur as rapidly as within a few minutes after mixing, since equipment typically used in the feed industry is not effective to homogenize these mixtures. Moreover, conventional feed supplement ingredients do not lend themselves to homogenization, due to their inherent lack of emulsifying properties. Sophisticated chemical emulsifiers have been tried with only moderate success in feed supplements; their high cost precludes commercial use.

Liquid feed supplements have a further disadvantage, compared to dry materials, of being more expensive to ship on a pound per pound of nutrient basis. By definition, liquid supplements contain water which must be transported and is a non-nutritive part of the supplement.

The present invention provides a method of increasing the energy content of a liquid feed supplement composition so that the energy provided to the consuming animals can be substantially increased thereby. In particular, the energy is increased by the addition of fat incorporated in the liquid feed supplement in a dispersed form. The liquid feed supplement remains stable with storage so that the fat content does not separate from the aqueous portion of the liquid feed supplement to form separate phases. Moreover, the liquid feed supplement remains fluid, that is it does not gel or solidify. The supplement can be transported without plugging piping, pumps or other transport equipment.

Further, applicants' stable supplement can be in a highly concentrated form so that it may be economically transported. The concentrate may then be blended on site with water or with locally obtained nutrient solutions, such as molasses. By transporting the supplement as a concentrate considerable savings in transportation and handling costs can be achieved.

In particular, applicants' process involves reacting the fat with a base such as sodium hydroxide to at least partially saponify the fat to create sodium soaps of fatty acid from the fat source. This reaction is preferably carried out in conjunction with the aqueous phase, for example, by reacting the fat with sodium hydroxide in the presence of at least a portion of the total water content of the liquid feed concentrate. It is preferred that both the fat and water used in this phase be heated to an elevated temperature, for example above 150° F. The water is most preferably is heated at temperatures at or above 195° F. and the fat may be heated even higher, for example 235° F. or more. The sodium hydroxide or other base is incorporated in the aqueous phase. The aqueous phase and fat are then brought in contact and maintained in a heated condition with vigorous mixing for a period sufficient to permit at least partial saponification of the fat. This may take from approximately from 5 to 15 minutes, then the reacted fat and water are blended. The remaining ingredients, such as additional proportions of water and nutrients, such as urea, phosphoric acid, ammonium polyphosphate, trace minerals, vitamin concentrates and calcium sources are added to the reacted solution. Additional materials, such as attapulgite clay and calcium chloride may be added to act as stabilizing agents to help maintain the emulsion of oil in liquid. Calcium chloride, in particular, can supply an additional source of nutrient calcium.

It is an object therefor of the present invention to provide a liquid feed composition which contains an increased energy level.

It is a further object of the present invention to provide a liquid feed composition which contains a stable dispersion of fat as a nutrient ingredient.

It is an object of the present invention to provide a liquid feed supplement which comprises a stable emulsion of liquid and aqueous phases having other nutrient materials combined therewith.

It is also an object of the present invention to provide a concentrated liquid feed supplement which can be blended with additional materials at the site of use.

DESCRIPTION OF THE PREFERRED EMBODIMENTS

In accordance with the present invention a liquid feed composition has been developed which is capable of remaining stable while containing a high energy level present as added fat. The energy added as added fat may be from about 3 to above about 5% by weight and preferably between about 3-12% by weight, more preferably between about 10% by weight. The liquid feed supplement will preferably have a high crude protein value, for example up to about 60% by weight. The crude protein can be present as a non-protein nitrogen source such as a ammonium polyphosphates urea, biuret and the like. Other nutrient materials including between about 2-5% phosphorous, 0-8% calcium and trace nutrients and vitamins may also be present. Thickeners, such as attapulgite clay and calcium chloride, may be added to increase viscosity. The liquid feed supplement may contain up to about 10% or more molasses or other equivalent carbohydrate sources.

In general, the liquid supplement will contain between about 20-80% water, preferably between about 25-60% water. The supplement will contain between about 3% added fat, preferably above about 5% added fat, for example between about 3-12% by weight added fat or more preferably between about 5-12% added fat. The supplement may contain between about 0-20% of a non-protein nitrogen source and between about 0-8% thickeners. The thickeners may include between about 0-6% calcium chloride and between about 0-2% attapulgite clay. The supplement will contain between about 0.2-4% of sodium hydroxide. It should be understood that at least a portion of the fat and sodium hydroxide will be present as their fatty acid sodium salt reaction products. The sodium hydroxide and fat present in the liquid supplement are further preferably present, in their as added form, in proportions of between about six fat/one NaOH to ten fat/one NaOH. More preferably the ratio of fat to base is about eight to one. It will be understood that all proportions and percentages are on a weight basis.

The liquid supplement product will remain storage stable with no substantial fat separation for at least 8 weeks or more under ambient storage conditions without the need for additional suspending or dispersing agents to emulsify the fat in the aqueous phase.

The liquid feed supplement is prepared by forming sodium or sodium and calcium salts of thre fatty acids in the added fat. The process preferably takes place under elevated temperature conditions, preferably with a heated aqueous sodium hydroxide solution being combined with the heated fat. The aqueous sodium hydroxide solution is preferably heated to above about 150° F. and preferably to about 195°-200° F. The added fat is preferably heated to above about 200° F. and most preferably to above 235°-240° F. prior to being combined with the aqueous sodium hydroxide solution. The heated fractions are combined with intimate mixing to form a reacted emulsified premix in which the additional nutrient materials are dispersed.

For purposes of a full and complete disclosure the following examples are set forth as illustrative, rather than limiting the embodiments thereof.

EXAMPLE 1

A positionally stable high moisture, high energy liquid feed supplement is prepared by mixing 0.8 parts by weight of sodium hydroxide dry with 56.1 parts by weight of water which was preheated to 195° F. The sodium hydroxide and water were mixed for about 15 seconds in a mixer and 6.3 parts by weight of yellow grease which had been preheated to 235° F. was then added. The aqueous sodium hydroxide and grease fractions were mixed for about 10 minutes in the mixer. At the end of this time 16.9 parts by weight ammonium polyphosphate, 1.5 parts by weight attapulgite clay and 17.4 parts by weight urea were added and mixed into the supplement. One part by weight of calcium chloride was added and the liquid feed concentrate was mixed for an additional two minutes. The mixture was then dispensed into containers and allowed to cool to ambient temperature. The pH of the formed supplement was 6.5. The containers of liquid feed supplement were placed in ambient storage and observed. No fat separation was observed on storage for eight weeks.

EXAMPLE 2

A positionally stable high moisture, high energy liquid feed supplement is prepared by mixing 0.8 parts by weight of sodium hydroxide dry with 54.1 parts by weight of water which was preheated to 195° F. The sodium hydroxide and water were mixed for 15 seconds in a mixer and 6.3 parts by weight of yellow grease which had been preheated to 235° F. was then added. The aqueous sodium hydroxide and grease fractions were mixed for 10 minutes in the mixer. At the end of this time 16.9 parts by weight ammonium polyphosphate, 1.5 parts by weight attapulgite clay and 17.4 parts by weight urea were added and mixed in to the supplement. Three parts of weight of calcium chloride were added and the liquid feed concentrate was then mixed for an additional two minutes. The mixture was then dispensed into containers and allowed to cool to ambient temperature. The pH of the formed supplement was 6.4. The containers of liquid feed supplement were placed in ambient storage and observed. No fat separation was observed on storage for eight weeks.

It will be appreciated by those skilled in the art that modifications to the invention disclosed herein may be made by those skilled in the art. The invention disclosed herein is not to be limited by the examples given herein for illustrative purposes, but only by the scope of the claims appended hereto and their equivalents.

What is claimed is:

1. A stable liquid feed concentrate which upon dilution with water becomes a liquid feed composition for animals, the concentrate consisting essentially of an aqueous phase containing nutrients, a dispersion in said aqueous phase of fat in an amount normally separating as an oil phase added in order to confer an increased energy level to the feed concentrate and, as a dispersing agent stabilizing the fat against separation from the aqueous phase, the sodium hydroxide saponification product of a portion of the fatty acids contained in the added fat, included in the concentration in an amount effective to form a stable dispersion without further processing.

2. The product of claim 1 wherein the fatty acid salts are formed from at least a portion of the added fat.

3. The product of claim 2 wherein the fatty acid salts are sodium salts.

4. The product of claim 2 wherein the fatty acid salts are sodium and calcium salts.

5. The product of claim 1 wherein the product contains between about 20-80% water.

6. The product of claim 1 wherein the product contains between about 25-60% water.

7. The product of claim 1 wherein the product contains above about 5% added fat.

8. The product of claim 1 wherein the product contains between about 3-12% added fat.

9. The product of claim 1 wherein the product contains between about 0-20% of a non-protein nitrogen source.

10. The product of claim 1 contains between about 0.2-4% of sodium hydroxide, at least a portion of the fat and sodium hydroxide being present as their fatty acid sodium salt reaction products.

11. A method of producing a stable aqueous phase liquid feed concentrate containing an increased energy level from added fat, the fat being present above the level at which it would normally separate from the aqueous phase under ambient conditions, consisting essentially of reacting at least a portion of the added fat with sodium hydroxide to form fatty acid salts, the amount of resulting fatty acid salts being effective to form a stable dispersion of the remaining fat in the liquid feed concentrate without further processing, and combining the liquid feed concentrate with other nutrient materials.

12. The method of claim 11 wherein the liquid feed supplement formed is a concentrate and the formed concentrate is diluted.

13. The method of claim 12 wherein the concentrate is diluted in an amount between about 1/9 and 9/1.

14. The method of claim 11 wherein the fat is reacted with sodium hydroxide.

15. The method of claim 14 wherein the liquid feed supplement contains some calcium present as a fatty acid calcium salt.

16. The method of claim 11 wherein the fat and base are reacted at an elevated temperature.

17. The method of claim 16 wherein the base is added to water at a temperature above about 150° F., the fat is heated to above about 200° F. and the heated water and fat fractions are reacted.

18. The method of claim 11 wherein the ratio of fat to base as present in their added form is from between about 6 fat/1 base to 10 fat/1 base.

19. The method of claim 18 wherein the proportion of fat to base is about eight fat/1 base.

20. The method claim 11 wherein the fatty acid salts are effective to maintain the liquid feed supplement in a stable dispersion without substantial fat separation for at least about eight weeks ambient storage.

21. A high energy liquid animal feed supplement consisting essentially of 20 to 80 percent water, 3 to 12 percent added fat, an amount of sodium hydroxide in the range of 0.2 to 4 percent to react in situ with up to 4 percent of the fat to form sufficient sodium salt thereof to be effective to prevent an added fat phase separation, 10 to 20 percent of a non-protein nitrogen source including ammonium polyphosphates, urea and biuret, 0 to 6 percent calcium chloride, 0 to 8 percent nutrient materials including phosphorous, calcium and vitamins, and 0 to 2 percent thickners, including attapulgite clay.

22. A method of producing a stable high moisture aqueous liquid feed supplement containing an increased energy level from added fat, the fat being present in the range of 5 to 12 percent above the level at which it would normally separate from the aqueous base under ambient conditions consisting essentially of forming a stable dispersion of the fat in the liquid supplement by reacting at a temperature in the range of 150 ° F. to 240 ° F. a portion of the added fat with 0.2 to 4 percent sodium hydroxide to form fatty acid salts, in an amount effective to stabilize the fat against separation from the aqueous liquid feed supplement, and combining the resulting dispersion with other nutrient materials.

* * * * *